(12) United States Patent
Wakamatsu et al.

(10) Patent No.: US 7,561,961 B2
(45) Date of Patent: Jul. 14, 2009

(54) VEHICLE POSITION ESTIMATING APPARATUS AND VEHICLE POSITION ESTIMATING METHOD

(75) Inventors: Kotaro Wakamatsu, Iwaki (JP); Takayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 46 days.

(21) Appl. No.: 11/566,502

(22) Filed: Dec. 4, 2006

(65) Prior Publication Data

US 2007/0150192 A1 Jun. 28, 2007

(30) Foreign Application Priority Data

Dec. 5, 2005 (JP) .............................. 2005-350320

(51) Int. Cl.
*G01C 21/00* (2006.01)
*G08G 1/123* (2006.01)
(52) U.S. Cl. .................................. 701/207; 340/995.18
(58) Field of Classification Search ........................ None
See application file for complete search history.

(56) References Cited

U.S. PATENT DOCUMENTS 5,602,740 A * 2/1997 Nishiyama .................. 701/207
6,308,134 B1 * 10/2001 Croyle et al. ................ 701/220
6,597,985 B2  7/2003 Toyooka
6,785,609 B2  8/2004 Suda
2002/0177950 A1 * 11/2002 Davies ........................ 701/213
2003/0216865 A1 * 11/2003 Riewe et al. ................ 701/220

FOREIGN PATENT DOCUMENTS

JP  2002-333332  11/2002
JP  2004-271293  9/2004

\* cited by examiner

*Primary Examiner*—Khoi Tran
*Assistant Examiner*—Nicholas Kiswanto
(74) *Attorney, Agent, or Firm*—Brinks Hofer Gilson & Lione

(57) ABSTRACT

A vehicle position estimating apparatus for estimating a vehicle position on the basis of a vehicle position (GPS position) calculated from a signal received from a GPS satellite includes a travel direction history storage unit for storing a plurality of pieces of vehicle travel direction history information and a position estimating unit for predicting the position of a vehicle at the next position measurement time and a vehicle position range in which the vehicle is likely to be located at the next position measurement time on the basis of the GPS position, a vehicle velocity (GPS velocity), and a vehicle travel direction (GPS travel direction) which are calculated from the transmitted GPS signal or on the basis of the position of the vehicle that has been predicted at the previous position measurement time, the GPS velocity, and data on a vehicle travel direction stored in the travel direction history storage unit.

8 Claims, 10 Drawing Sheets

| HISTORY NO | $\theta_{REF}$ | $\Delta v$ |
|---|---|---|
| 1 | $(\theta_{REF})_1$ | $(\Delta v)_1$ |
| 2 | $(\theta_{REF})_2$ | $(\Delta v)_2$ |
| 3 | $(\theta_{REF})_3$ | $(\Delta v)_3$ |
| ⋮ | ⋮ | ⋮ |
| 9 | $(\theta_{REF})_9$ | $(\Delta v)_9$ |
| 10 | $(\theta_{REF})_{10}$ | $(\Delta v)_{10}$ |

FIG. 9

AFTER T-1 SECONDS

| HISTORY NO. | $\theta_{REF}$ | $\Delta v$ |
|---|---|---|
| 1 | $(\theta_{REF})_1$ | $(\Delta v)_1$ |
| 2 | $(\theta_{REF})_2$ | $(\Delta v)_2$ |
| 3 | $(\theta_{REF})_3$ | $(\Delta v)_3$ |
| ... | ... | ... |
| 9 | $(\theta_{REF})_9$ | $(\Delta v)_9$ |
| 10 | $(\theta_{REF})_{10}$ | $(\Delta v)_{10}$ |

RELIABLE →

AFTER T SECONDS

| HISTORY NO. | $\theta_{REF}$ | $\Delta v$ |
|---|---|---|
| 1 | GPS TRAVEL DIRECTION $\theta_{GPS}$ ACQUIRED THIS TIME | $\Delta v$ ACQUIRED THIS TIME |
| 2 | $(\theta_{REF})_1 + \theta_{GYRO}$ | $(\Delta v)_1$ |
| 3 | $(\theta_{REF})_2 + \theta_{GYRO}$ | $(\Delta v)_2$ |
| ... | ... | ... |
| 9 | $(\theta_{REF})_8 + \theta_{GYRO}$ | $(\Delta v)_8$ |
| 10 | $(\theta_{REF})_9 + \theta_{GYRO}$ | $(\Delta v)_9$ |

UNRELIABLE →

AFTER T SECONDS

| HISTORY NO. | $\theta_{REF}$ | $\Delta v$ |
|---|---|---|
| 1 | $(\theta_{REF})_1 + \theta_{GYRO}$ | $(\Delta v)_1$ |
| 2 | $(\theta_{REF})_2 + \theta_{GYRO}$ | $(\Delta v)_2$ |
| 3 | $(\theta_{REF})_3 + \theta_{GYRO}$ | $(\Delta v)_3$ |
| ... | ... | ... |
| 9 | $(\theta_{REF})_9 + \theta_{GYRO}$ | $(\Delta v)_9$ |
| 10 | $(\theta_{REF})_{10} + \theta_{GYRO}$ | $(\Delta v)_{10}$ |

VEHICLE POSITION ESTIMATING APPARATUS AND VEHICLE POSITION ESTIMATING METHOD

RELATED APPLICATIONS

The present application claims priority to Japanese Patent Application No. 2005-350320, filed Dec. 5, 2005, the entirety of which is hereby incorporated by reference.

BACKGROUND OF THE INVENTION

1. Field of the Invention

The present invention relates to vehicle position estimating apparatuses and vehicle position estimating methods, and, more particularly, to a vehicle position estimating apparatus and a vehicle position estimating method capable of estimating a vehicle position on the basis of a position (GPS position) calculated from a GPS signal received from a GPS satellite.

2. Description of the Related Art

Navigation apparatuses read out map data corresponding to a current vehicle position from a recording medium such as a CD-ROM, a DVD, or an HDD, and draw a map on a display screen on the basis of the read out map data, and in addition, display a vehicle mark at a fixed position on the display screen, and scroll the map in accordance with vehicle movement. In addition, navigation apparatuses have a route guidance function in which a route from a starting point to a destination is searched for and the obtained route is displayed on a map, and a POI display function in which a predetermined POI mark (landmark) is displayed on a map.

A position measuring device for measuring a vehicle position is a necessity for such navigation apparatuses. In a first known position measuring method, a vehicle position is autonomously estimated using an angle sensor such as a gyro sensor for detecting a vehicle travel direction and a distance sensor (vehicle velocity sensor) for detecting a distance traveled every predetermined point in time, and map matching is performed as appropriate so as to correct the vehicle position so that the vehicle position can be located on a road on a map. In a second known position measuring method, a vehicle position is estimated using both a position (GPS position) calculated from radio waves received from a GPS (Global Positioning System) satellite and a position acquired by a self-contained navigation sensor. As examples of this method, there are first and second known techniques described in Japanese Unexamined Patent Application Publication Nos. 2002-333332 and 2004-271293.

In the first known technique of the above-described second known position measuring method, if the prediction error of self-contained positioning data does not exceed a predetermined threshold value, a current vehicle position is calculated by combining GPS positioning data with the self-contained positioning data, and in contrast, if the prediction error of the self-contained positioning data exceeds a predetermined threshold value, a current vehicle position is calculated without combining the GPS positioning data with the self-contained positioning data.

In the second known technique of the above-described second known position measuring method, a vehicle position and a vehicle position range are predicted using a self-contained navigation sensor, and if a GPS-measured position exists within the predicted vehicle position range, the GPS-measured position is defined as a current vehicle position, and in contrast, if the GPS-measured position exists out of the predicted vehicle position range, the predicted vehicle position is defined as a current vehicle position.

In the first known technique, a current vehicle position is usually acquired by combining the GPS positioning data and the self-contained positioning data. That is, a GPS-measured position is not normally defined as a current vehicle position. In addition, even if the GPS-positioning data becomes unreliable, the self-contained positioning data is not used instead of the GPS positioning data.

In the second known technique, a GPS-measured position is acquired using GPS positioning data and map data. That is, the GPS-measured position acquired only from the GPS positioning data is not defined as a current vehicle position. In addition, a vehicle position and a vehicle position range are predicted using a self-contained navigation sensor all the time, and if a GPS-measured position exists within the predicted vehicle position range, the GPS-measured position is defined as a current vehicle position, and in contrast, if the GPS-measured position exists out of the predicted vehicle position range, the predicted vehicle position is defined as a current vehicle position.

SUMMARY OF THE INVENTION

The present invention has been made in view of the above-described background, and it is an object of the present invention to provide a vehicle position estimating apparatus and a vehicle position estimating method capable of appropriately estimating a vehicle position using position (GPS position) data and velocity (GPS velocity) data which are acquired from a transmitted GPS signal even when GPS signal receiving conditions are poor, and displaying the estimated vehicle position.

It is another object of the present invention to provide a vehicle position estimating apparatus and a vehicle position estimating method capable of appropriately estimating a vehicle position using a self-contained navigation sensor when GPS radio waves cannot be received, and displaying the estimated vehicle position.

According to an embodiment of the present invention, there is provided a vehicle position estimating apparatus and a vehicle position estimating method capable of estimating a vehicle position on the basis of a GPS position calculated from a signal received from a GPS satellite.

A vehicle position estimating apparatus according to an embodiment of the present invention estimates a vehicle position on the basis of a vehicle position (GPS position) calculated from a signal received from a GPS satellite, and includes a travel direction history storage unit for storing a plurality of pieces of vehicle travel direction history information and a position estimating unit for predicting the position of a vehicle at the next position measurement time and a vehicle position range in which the vehicle is likely to exist at the next position measurement time. When the GPS position exists within a vehicle position range that has been predicted at the previous position measurement time, the position estimating unit defines the GPS position as the current position of the vehicle, and predicts the position of the vehicle at the next measurement time and a vehicle position range in which the vehicle is likely to exist at the next measurement time on the basis of the GPS position, a vehicle velocity (GPS velocity), and a vehicle travel direction (GPS travel direction) which are calculated from the signal received from a GPS satellite. When the GPS position does not exist within the vehicle position range, the position estimating unit defines the position of the vehicle that has been predicted at the previous position measurement time as the current position of the vehicle, and predicts the position of the vehicle at the next measurement time and the vehicle position range in which the vehicle is likely to exist at the next measurement time on the basis of the current vehicle position, the GPS velocity, and data on a vehicle travel direction stored in the travel direction history storage unit.

The vehicle position estimating apparatus further includes a self-contained navigation sensor for detecting a travel direction change $\theta_{GYRO}$ and a distance traveled every predetermined point in time, a GPS position reliability determining unit for determining whether a GPS position is reliable, and a travel direction history updating unit for updating the pieces of travel direction history information stored in the travel direction history storage unit, the pieces of travel direction history information each including data on a vehicle travel direction and data on a vehicle velocity difference $\Delta V$ between a GPS velocity and a vehicle velocity detected by the self-contained navigation sensor. When it is determined that a GPS position is reliable by the GPS position reliability determining unit, the travel direction history updating unit stores the latest GPS travel direction calculated from a signal received from a GPS satellite and the vehicle velocity difference $\Delta V$ in the travel direction history storage unit as the latest piece of travel direction history information, and deletes the oldest piece of travel direction history information stored in the travel direction history storage unit, and updates the remaining pieces of travel direction history information stored in the travel direction history storage unit by adding the travel direction change $\theta_{GYRO}$ to the remaining pieces of travel direction history information. When it is determined that the GPS position is unreliable by the GPS position reliability determining unit, the travel direction history updating unit updates all the pieces of travel direction history information stored in the travel direction history storage unit by adding the travel direction change $\theta_{GYRO}$ to all the pieces of travel direction history information. When a GPS position does not exist within a vehicle position range that was predicted at the previous position measurement time, the position estimating unit predicts the position of the vehicle at the next measurement time and a vehicle position range in which the vehicle is likely to exist at the next measurement time on the basis of data on a vehicle travel direction $\theta$ included in one of the pieces of travel direction history information having data on the vehicle velocity difference $\Delta V$ of the minimum value.

In the vehicle position estimating apparatus, the GPS position reliability determining unit determines that a GPS position is unreliable when any one of the following conditions is met: a vehicle position cannot be measured using a signal received from a GPS satellite; a vehicle velocity calculated from a signal received from a GPS satellite is equal to or less than 1 km/h; a difference value between a GPS travel direction change and the travel direction change $\theta_{GYRO}$ detected by the self-contained navigation sensor is equal to or greater than a preset value; and the value of the travel direction change $\theta_{GYRO}$ is equal to or greater than a preset value.

The vehicle position estimating apparatus further includes a self-contained navigation position estimating unit for predicting the position of the vehicle at the next position measurement time and a vehicle position range in which the vehicle is likely to exist at the next position measurement time on the basis of a signal generated by a self-contained navigation sensor. When a vehicle position cannot be measured using a signal received from a GPS satellite, the position estimating unit defines a vehicle position that has been predicted by the self-contained navigation position estimating unit as a current vehicle position. After it has become possible to measure a vehicle position using a signal received from a GPS satellite, when a GPS position exists within a vehicle position range that has been predicted by the self-contained navigation position estimating unit, the position estimating unit defines the GPS position as a current vehicle position, and, when the GPS position does not exist within the vehicle position range, the position estimating unit defines the vehicle position that has been predicted by the self-contained navigation position estimating unit as a current vehicle position.

A vehicle position estimating method of estimating a vehicle position on the basis of a vehicle position (GPS position) calculated from a signal received from a GPS satellite according to an embodiment of the present invention includes the acts of storing a plurality of pieces of vehicle travel direction history information in a travel direction history storage unit and predicting the position of a vehicle at the next position measurement time and a vehicle position range in which the vehicle is likely to exist at the next position measurement time. When the GPS position exists within a vehicle position range that has been predicted at the previous position measurement time, the GPS position is defined as the current position of the vehicle, and the position of the vehicle at the next measurement time and a vehicle position range in which the vehicle is likely to exist at the next measurement time are predicted on the basis of the GPS position, a vehicle velocity (GPS velocity), and a vehicle travel direction (GPS travel direction) which are calculated from the signal received from a GPS satellite. When the GPS position does not exist within the vehicle position range, the position of the vehicle that has been predicted at the previous position measurement time is defined as the current position of the vehicle, and the position of the vehicle at the next measurement time and the vehicle position range in which the vehicle is likely to exist at the next measurement time are predicted on the basis of the current vehicle position, the GPS velocity, and data on a vehicle travel direction stored in the travel direction history storage unit.

The vehicle position estimating method further includes the acts of causing a self-contained navigation sensor to detect a travel direction change $\theta_{GYRO}$ and a distance traveled every predetermined point in time, determining whether a GPS position is reliable, and updating the pieces of travel direction history information each including data on a vehicle travel direction and data on a vehicle velocity difference $\Delta V$ between a GPS velocity and a vehicle velocity detected by the self-contained navigation sensor. When it is determined that a GPS position is reliable, the latest GPS travel direction calculated from a signal received from a GPS satellite and the vehicle velocity difference $\Delta V$ are stored in the travel direction history storage unit as the latest piece of travel direction history information, and the oldest piece of travel direction history information stored in the travel direction history storage unit is deleted, and the remaining pieces of travel direction history information stored in the travel direction history storage unit are updated by adding the travel direction change $\theta_{GYRO}$ to the remaining pieces of travel direction history information. When it is determined that the GPS position is unreliable, all the pieces of travel direction history information stored in the travel direction history storage unit are updated by adding the travel direction change $\theta_{GYRO}$ to the pieces of travel direction history information. When a GPS position does not exist within a vehicle position range that was predicted at the previous position measurement time, the position of the vehicle at the next measurement time and a vehicle position range in which the vehicle is likely to exist at the next measurement time are predicted on the basis of data on a vehicle travel direction $\theta$ included in one of the pieces of travel direction history information having data on the vehicle velocity difference $\Delta V$ of the minimum value.

In the vehicle position estimating method, it is determined that a GPS position is unreliable when any one of the following conditions is met: a vehicle position cannot be measured using a signal received from a GPS satellite; a vehicle velocity calculated from a signal received from a GPS satellite is equal to or less than 1 km/h; a difference value between a GPS travel direction change and the travel direction change $\theta_{GYRO}$ detected by the self-contained navigation sensor is equal to or greater than a preset value; and the value of the travel direction change $\theta_{GYRO}$ is equal to or greater than a preset value.

The vehicle position estimating method further includes the act of predicting the position of the vehicle at the next position measurement time and a vehicle position range in which the vehicle is likely to exist at the next position measurement time on the basis of a signal generated by a self-contained navigation sensor. When a vehicle position cannot be measured using a signal received from a GPS satellite, a vehicle position that has been predicted using the signal generated by the self-contained navigation sensor is defined as a current vehicle position. After it has become possible to measure a vehicle position using a signal received from a GPS satellite, when a GPS position exists within a vehicle position range that has been predicted using the signal generated by the self-contained navigation sensor, the GPS position is defined as a current vehicle position, and, when the GPS position does not exist within the vehicle position range, the vehicle position that has been predicted using the signal generated by the self-contained navigation sensor is defined as a current vehicle position.

According to an embodiment of the present invention, there is provided a vehicle position estimating apparatus and a vehicle position estimating method capable of appropriately estimating a vehicle position even when GPS signal receiving conditions are poor, and displaying the estimated vehicle position.

According to an embodiment of the present invention, there is provided a vehicle position estimating apparatus and a vehicle position estimating method capable of appropriately estimating a vehicle position when GPS radio waves cannot be received, and displaying the estimated vehicle position.

BRIEF DESCRIPTION OF THE DRAWINGS

FIG. 9 is a diagram describing travel history updating;

DESCRIPTION OF THE PREFERRED EMBODIMENT

In a vehicle position estimating apparatus for estimating a vehicle position on the basis of a vehicle position (GPS position) calculated from a signal received from a GPS satellite, when it is determined that the GPS position is reliable, a travel direction history updating section stores the latest GPS travel direction calculated from the signal received from a GPS satellite and a vehicle velocity difference $\Delta V$ between a GPS velocity calculated from the signal received from a GPS satellite and a vehicle velocity detected by a self-contained navigation sensor in a travel direction history storage section as the latest piece of travel direction history information, and deletes the oldest piece of travel direction history information stored in the travel direction history storage section, and updates the remaining pieces of travel direction history information stored in the travel direction history storage section by adding a travel direction change $\theta_{GYRO}$ detected by the self-contained navigation sensor to the remaining pieces of travel direction history information. When it is determined that the GPS position is unreliable, the travel direction history updating section updates all the pieces of travel direction history information stored in the travel direction history storage section by adding the travel direction change $\theta_{GYRO}$ to all the pieces of travel direction history information.

When the GPS position exists within a vehicle position range that has been predicted at the previous position measurement time, a vehicle position estimating section defines the GPS position as the current position of the vehicle, and predicts the position of the vehicle at the next measurement time and a vehicle position range in which the vehicle is likely to be located at the next measurement time on the basis of the GPS position, a vehicle velocity (GPS velocity), and a vehicle travel direction (GPS travel direction) which are calculated from the signal received from a GPS satellite. When the GPS position does not exist within the vehicle position range, the vehicle position estimating section defines the position of the vehicle that has been predicted at the previous position measurement time as the current position of the vehicle, and predicts the position of the vehicle at the next measurement time and the vehicle position range in which the vehicle is likely to be located at the next measurement time on the basis of the current vehicle position, the UPS velocity, and data on a vehicle travel direction stored in the travel direction history storage section.

(A) Principle of Embodiment

FIG. 1 is a diagram describing the principle of an embodiment of the present invention.

Figure 1A:
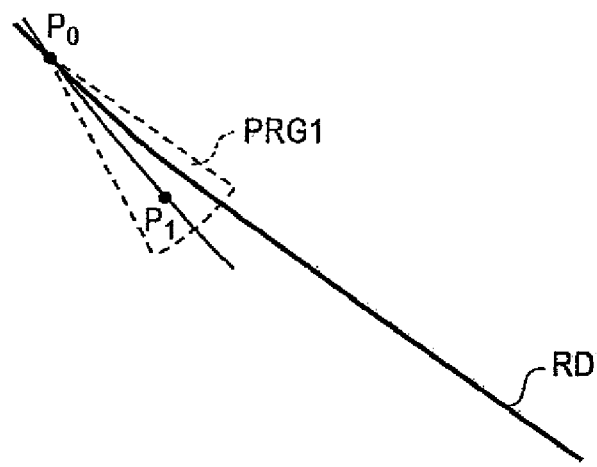
FIGS. 1A through 1C are diagrams describing the principle of an embodiment of the present invention.
Figure 1B:
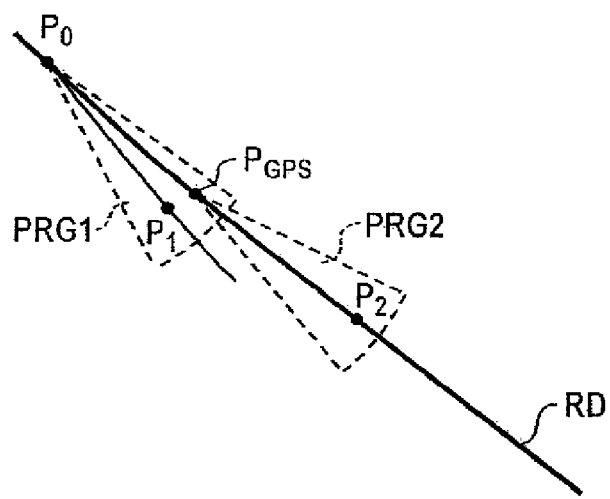

As shown in FIG. 1A, at the first position measurement time $T_0$, the vehicle position estimating section (not shown) acquires a GPS position $P_0$ and a GPS velocity $V_{GPS}$ from a transmitted GPS signal, and predicts a vehicle position $P_1$ at the second position measurement time T and a vehicle position range $PRG_1$ in which a vehicle is likely to be located at the second position measurement time $T_1$ on the basis of the acquired GPS position $P_0$ and GPS velocity $V_{GPS}$ and a vehicle travel direction $\theta$ stored in the travel direction history storage section (not shown). Subsequently, at the second position measurement time $T_1$, as shown in FIG. 1B, if a GPS position $P_{GPS}$ acquired from a transmitted GPS signal exists within the predicted vehicle position range PRG1, the GPS position $P_{GPS}$ is defined as a current vehicle position, and then, a vehicle position $P_2$ at the third position measurement time $T_2$ and a vehicle position range in which the vehicle is likely to exist at the third measurement time $T_2$ are predicted.

Figure 1C:
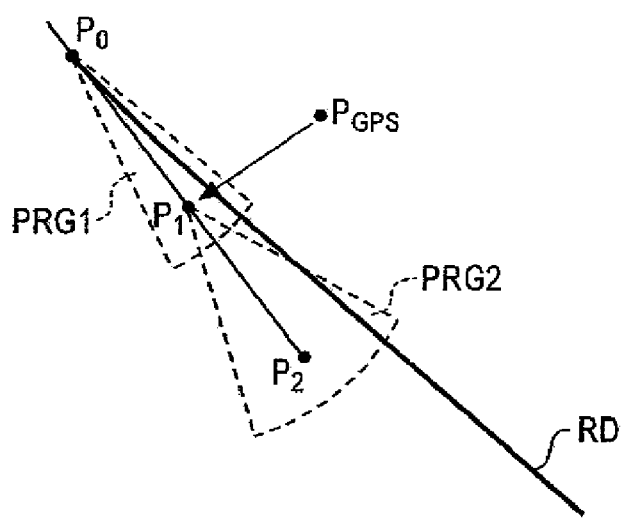

On the other hand, at the second position measurement time $T_1$, if position detection could not be accurately performed due to multipath interference, and therefore, if the GPS position $P_{GPS1}$ does not exist within the predicted vehicle position range PRG1, as shown in FIG. 1C, the predicted vehicle position $P_1$ is defined as a current vehicle position. Subsequently, the vehicle position $P_2$ at the third measurement time $T_2$ and the vehicle position range PRG2 in which the vehicle is likely to be located at the third measurement time $T_2$ are predicted so that the angle of the vehicle position range PRG2 can be larger than that of the vehicle position range PRG1 and a road RD can be included in the vehicle position range PRG2. Consequently, at the third position measurement time $T_2$, if a GPS position is accurately detected from a transmitted GPS signal, and if the detected GPS position exists on the road RD, the detected GPS position can be used as a current vehicle position.

Figure 2:
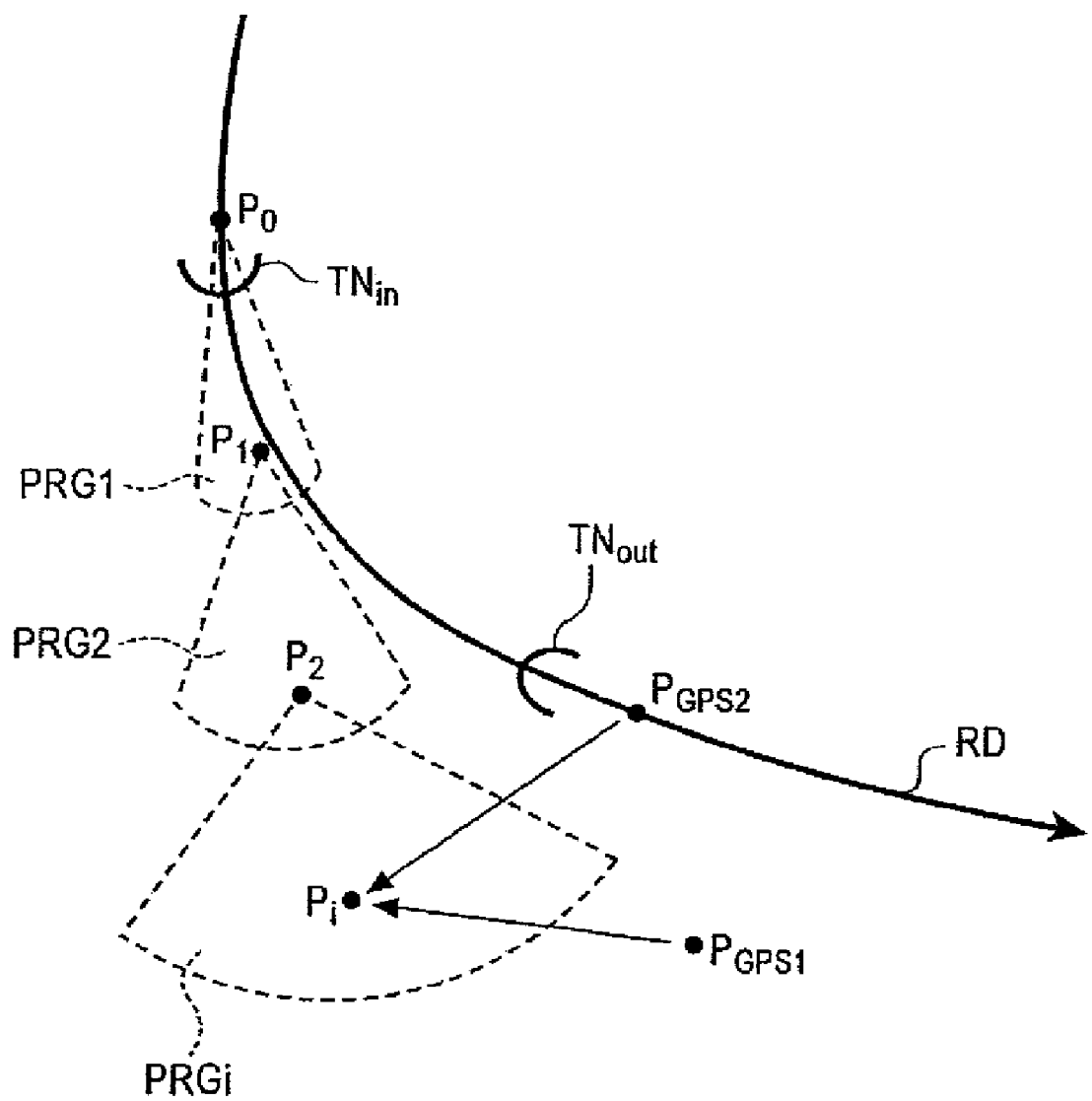
FIG. 2 is a diagram describing the principle of an embodiment of the present invention.

The above-described method can be applied when GPS positioning can be performed. However, there are cases in which radio waves cannot be received from any available GPS satellites, such as when a vehicle travels through a tunnel or in an area with many buildings. In these cases, if the difference between a vehicle travel direction before the tunnel and a vehicle travel direction inside the tunnel is not large, a vehicle position predicted using the above-described method does not significantly deviate from the road RD. However, if a vehicle travel direction significantly changes between $TN_{in}$ and $TN_{out}$ in the tunnel as shown in FIG. 2, the predicted vehicle position deviates from the road RD. Accordingly, even if a GPS position $P_{GPS2}$ is accurately detected when the vehicle emerges from the tunnel, a predicted vehicle position $P_1$ is undesirably defined as a current vehicle position, since the GPS position $P_{GPS2}$ does not exist within a predicted vehicle position range PRGi. In addition, if the GPS position is not accurately detected as indicated by a GPS position $P_{GPS1}$, the predicted position $P_i$ is also undesirably defined as a current vehicle position, since the GPS position $P_{GPS1}$ does not exist within the predicted vehicle position range PRGi.

Figure 3A:
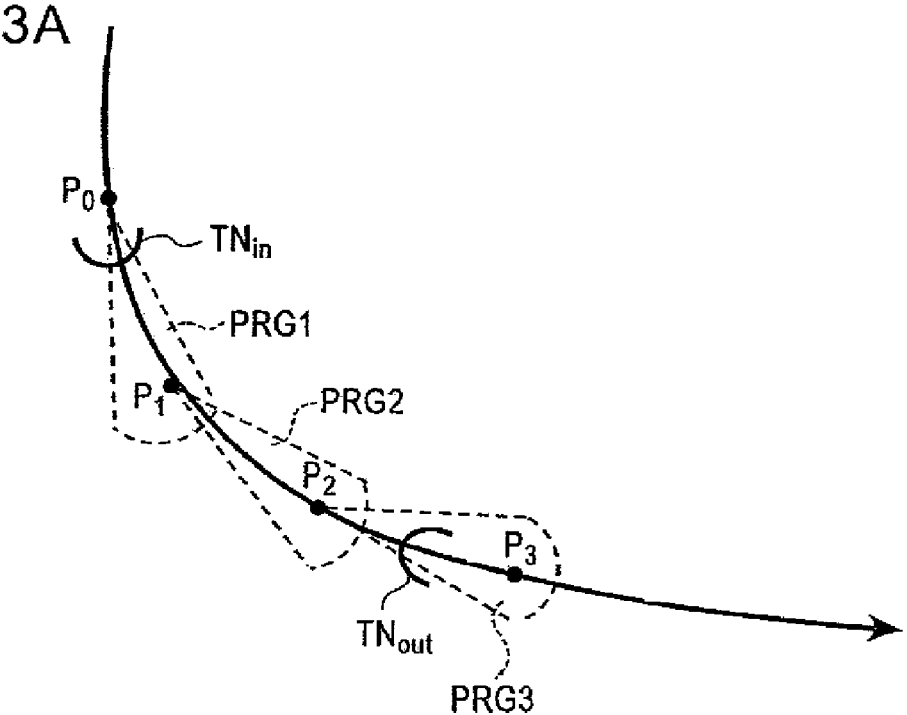
FIGS. 3A and 3B are diagrams describing the principle of an embodiment of the present invention.
Figure 3B:
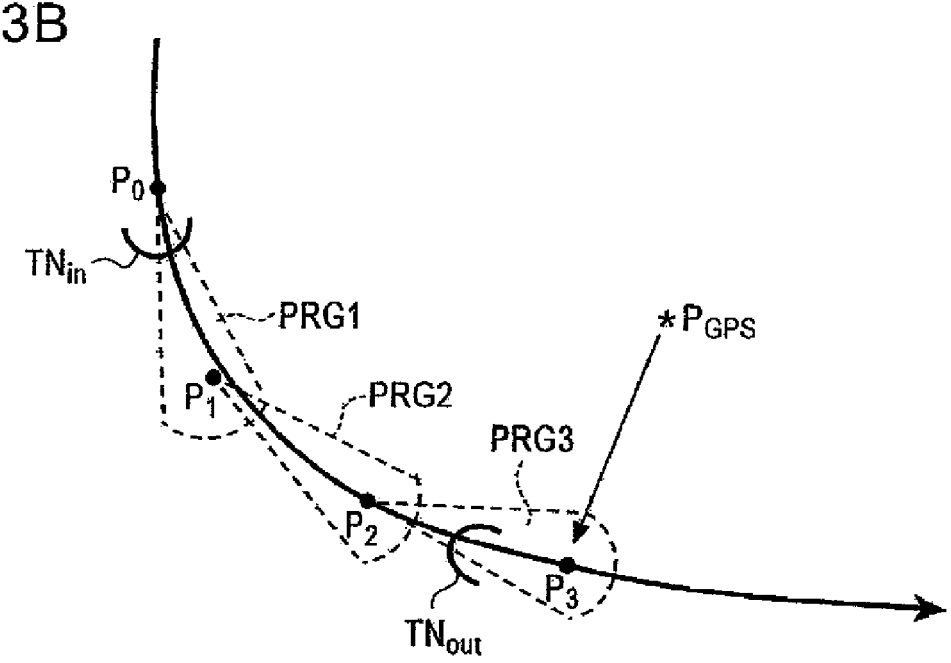

In order to prevent the above-described conditions, when GPS positioning cannot be performed, a vehicle position $P_{i+1}$ at the next position measurement time $T_{i+1}$ and a vehicle position range $PRG_{i+1}$ in which the vehicle is likely to be located at the next position measurement time $T_{i+1}$ are predicted using a signal generated by a self-contained navigation sensor (including an angle sensor and a distance sensor) as shown in FIG. 3A. When GPS positioning using a transmitted GPS signal becomes available, as shown in FIG. 3B, if a GPS position exists within the vehicle position range predicted by the self-contained navigation sensor, the GPS position is defined as a current vehicle position, and in contrast, if a GPS position $P_{GPS}$ does not exist within the vehicle position range PRG3 predicted by the self-contained navigation sensor, a vehicle position $P_3$ predicted by the self-contained navigation sensor is defined as a current vehicle position. Thus, a self-contained navigation sensor is used to estimate a vehicle position when GPS radio waves cannot be received, whereby the vehicle position can be appropriately estimated and the estimated vehicle position can be displayed.

(B) Navigation Apparatus

Figure 4:
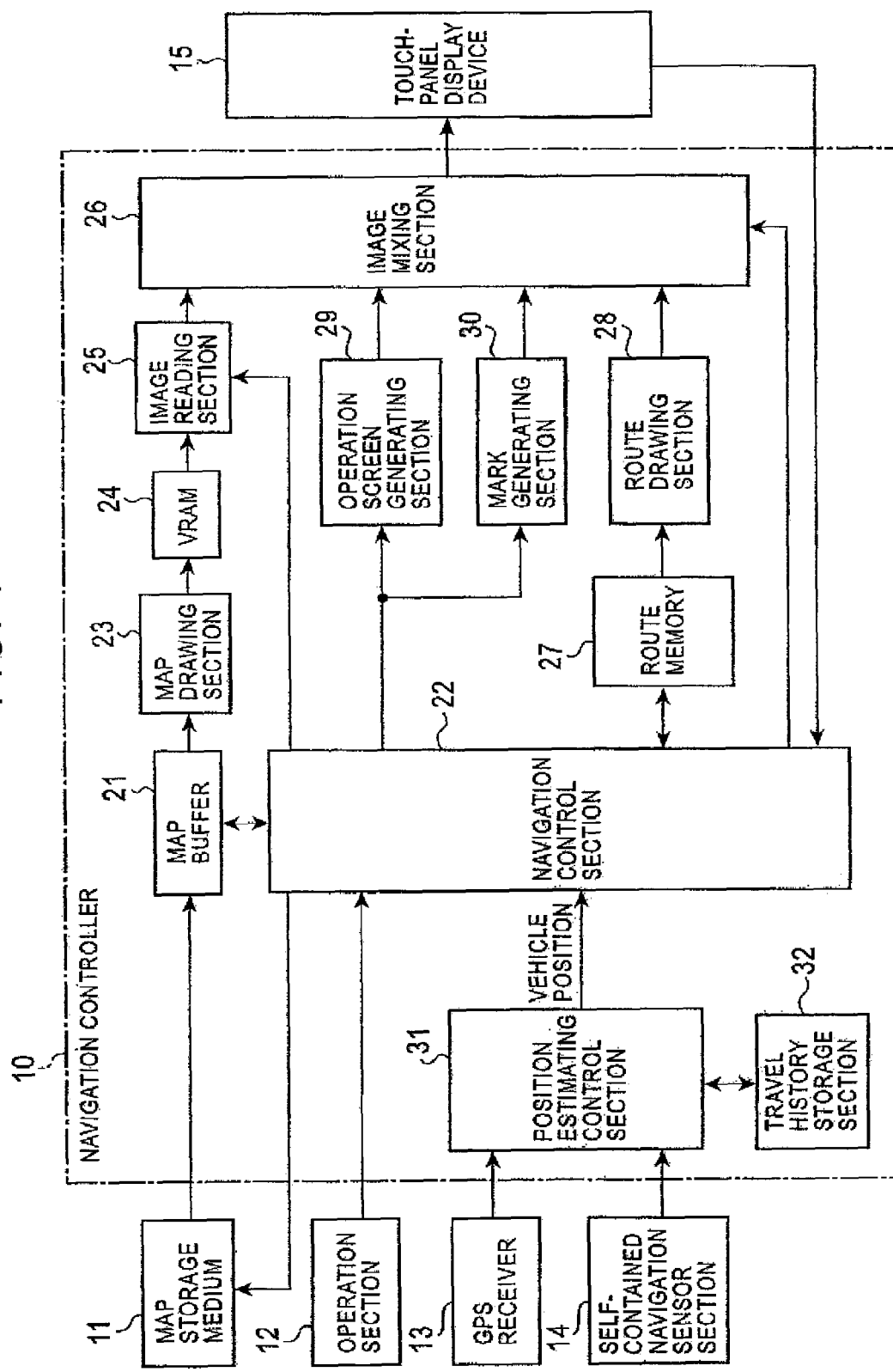
FIG. 4 is a diagram showing the configuration of a navigation apparatus according to an embodiment of the present invention.

FIG. 4 is a diagram showing the configuration of a navigation apparatus according to an embodiment of the present invention.

Map data is stored in a map storage medium 11 such as a CD-ROM or DVD, and is read out as appropriate. The map data is composed of a road layer used to search for a route, a background layer used to display objects on a map, and a character layer used to display characters representing city, town, and village names, etc. on a map. An operation section 12 is used to operate a navigation controller 10, and is configured with a remote controller, operation hard keys, etc.

A GPS receiver 13 receives a GPS signal transmitted from a GPS satellite, and calculates an absolute current vehicle position (GPS position) and a vehicle travel direction, and, in addition, calculates a vehicle velocity (GPS velocity) using the Doppler shift, and then provides the results of the calculations to the navigation controller 10. A self-contained navigation sensor section 14 detects a vehicle travel direction change $\theta_{GYRO}$ and a distance traveled every predetermined point in time. In addition, the self-contained navigation sensor section 14 autonomously estimates a vehicle position and provides the estimated vehicle position to the navigation controller 10 when GPS positioning cannot be performed.

A touch-panel display device 15 displays a map of an area around a vehicle, a route, a menu, a vehicle position mark, etc. in accordance with an instruction transmitted from the navigation controller 10, and is configured to supply a predetermined command to the navigation controller 10 when one of soft keys displayed on the screen thereof is pressed.

The navigation controller 10 is provided with the following components: a map buffer 21; a navigation control section 22; a map drawing section 23; a VRAM 24; an image reading section 25; an image mixing section 26; a route memory 27; a route drawing section 28; an operation screen generating section 29; a mark generating section 30; a position estimating control section 31; and a travel history storage section 32. The map buffer 21 stores map data read out from the map storage medium 11. The navigation control section 22 performs the following control operations in accordance with various transmitted information and commands: the control of map data writing in which data on a map of an area around a vehicle is written in the map buffer 21; route search and route guidance controls; and the control of generation of various operation display screens and vehicle marks. The map drawing section 23 generates a map image using the map data written in the map buffer 21, and writes the generated map image in the VRAM 24. The image reading section 25 cuts a predetermined image portion from the map image written in the VRAM 24 in accordance with a predetermined instruction transmitted from the navigation control section 22, and provides the cut portion to the image mixing section 26.

The route memory 27 records information about a route from a starting point to a destination which has been searched by the navigation control section 22, that is, position data on all nodes configuring the route. The route drawing section 28 generates a route image on the basis of the route information, and provides the generated route image to the image mixing section 26 to highlight it on a drawn map. The operation screen generating section 29 generates various menu screens (operation screens), and provides the generated screens to the image mixing section 26. The mark generating section 30 generates various marks such as a vehicle position mark and a cursor, and provides the generated marks to the image mixing section 26. The image mixing section 26 superimposes the various marks and the route image on the map image read out from the VRAM 24, and displays the superimposed map image on the screen.

The position estimating control section 31 estimates a vehicle position on the basis of signals transmitted from the GPS receiver 13 and the self-contained navigation sensor section 14, and provides the estimated vehicle position to the navigation control section 22. In addition, the position estimating control section 31 stores a vehicle travel direction and a velocity difference $\Delta V$ between a UPS velocity and a vehicle velocity detected by the self-contained navigation sensor section 14 in the travel history storage section 32 as travel history information. A plurality of pieces of, for example, ten pieces of, new travel history information are stored in the travel history storage section 32.

Figure 5:
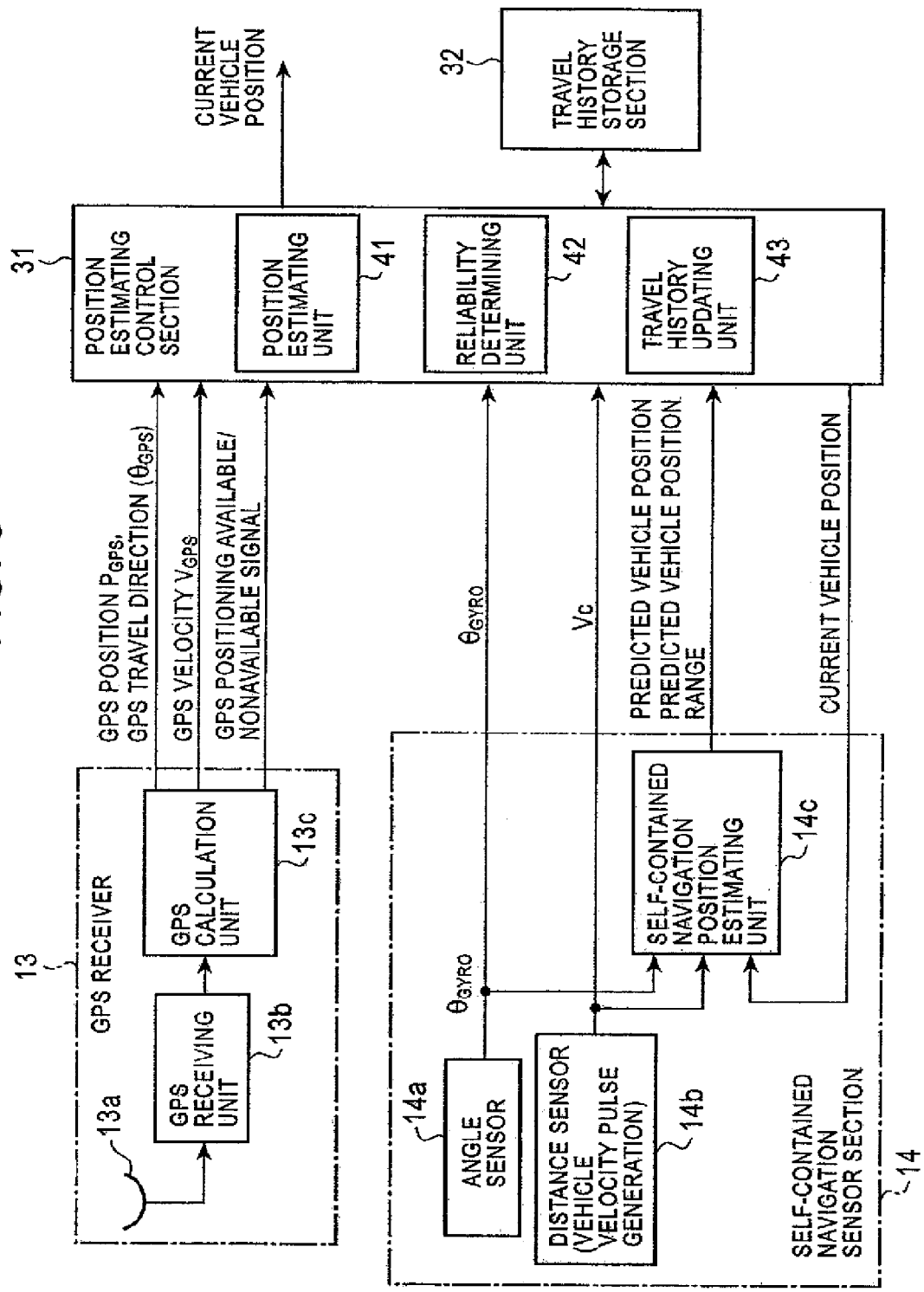
FIG. 5 is a detailed diagram showing the configuration of a vehicle position estimating section.

FIG. 5 is a detailed diagram showing the configuration of the vehicle position estimating section. In FIG. 5, the same reference numerals are used for components having the same functions as those of FIG. 4.

The GPS receiver 13 is provided with a GPS receiving antenna 13a, a GPS receiving unit 13b, a GPS calculation unit 13c for calculating an absolute current vehicle position (GPS position) and a vehicle travel direction (GPS travel direction) on the basis of a GPS signal, and, in addition, calculating a vehicle velocity (GPS velocity) using the Doppler shift.

The self-contained navigation sensor section 14 is provided with an angle sensor 14a such as a gyro sensor for detecting a vehicle rotation angle, a distance (vehicle velocity) sensor 14b for generating a pulse every certain distance traveled, and a self-contained navigation position estimating unit 14c. When GPS positioning cannot be performed, the self-contained navigation position estimating unit 14c estimates a vehicle position (self-contained navigation estimating position) at the next position measurement time using a current vehicle position and signals transmitted from individual sensors, and estimates a vehicle position range (self-contained navigation vehicle position range) in which a vehicle is likely to be located at the next position measurement time.

Figures 6, 7:
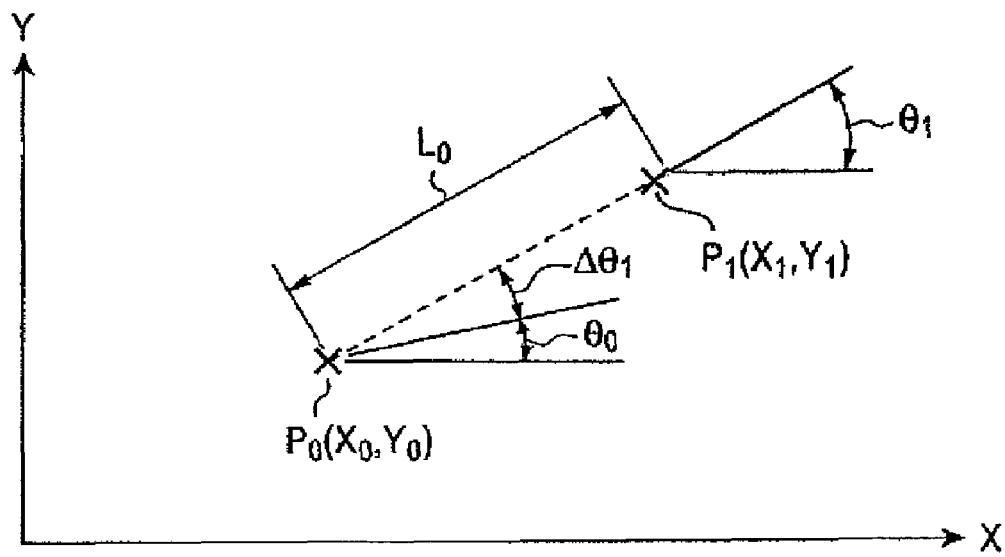
FIG. 6 is a diagram describing a vehicle position estimating method performed by a self-contained navigation sensor section.
FIG. 7 is a diagram describing travel history information.

FIG. 6 is a diagram describing a vehicle position estimating method performed by a self-contained navigation sensor section.

The distance sensor 14b outputs a pulse each time a vehicle has traveled a predetermined distance. Accordingly, a vehicle travel velocity V can be measured by counting the number of pulses per unit time. Here, the positive direction of the X-axis is defined as a reference azimuth ($\theta=0$), and a counterclockwise direction from the reference azimuth is defined as a positive direction. If the previous vehicle position is defined as a point P0 (X0, Y0), the absolute azimuth of a vehicle travel direction at the point P0 is defined as $\theta 0$, a distance traveled after unit time t has passed is defined as L0 (=V×t), and an output from a relative azimuth sensor after the unit time t has passed is defined as $\Delta\theta 1$, a change in the vehicle position is represented as follows.

$$\Delta X = L0 \cdot \cos(\theta 0 + \Delta\theta 1)$$

$$\Delta Y = L0 \cdot \sin(\theta 0 + \Delta\theta 1)$$

The estimated azimuth $\theta 1$ of a vehicle travel direction at a current point P1 and an estimated vehicle position (X1, Y1) at the current point P1 can be calculated by synthesizing vectors as follows.

$$\theta 1 = \theta 0 + \Delta\theta 1 \quad (1)$$

$$X1 = X0 + \Delta X = X0 + L0 \cdot \cos\theta 1 \quad (2)$$

$$Y1 = Y0 + \Delta Y = Y0 + L0 \cdot \sin\theta 1 \quad (3)$$

The position estimating control section 31 has a computer configuration, and is provided with a position estimating unit 41 for functionally controlling vehicle current position estimation, a reliability determining unit 42 for measuring the reliability of a GPS position, and a travel history updating unit 43 for controlling the updating of details of the travel history storage section 32.

As shown in FIG. 7, the travel history storage section 32 stores ten pieces of new information, each including data on a vehicle travel direction $\theta_{REF}$ and data on a vehicle velocity difference $\Delta V$. The vehicle velocity difference $\Delta V$ is a difference between a GPS velocity calculated from a GPS signal using the Doppler shift and a vehicle velocity detected by the self-contained navigation sensor section 14. It should be noted that all of the ten pieces of vehicle travel direction data correspond to a current vehicle travel direction. The travel history updating unit 43 performs updating processing so that all of the ten pieces of vehicle travel direction data can correspond to a current vehicle travel direction. When a GPS position is located out of a predicted vehicle position range, the position estimating unit 41 selects one piece of information including data on the vehicle velocity difference $\Delta V$ of the minimum value from among the ten pieces of information, and predicts a vehicle position and a vehicle position range using vehicle travel direction data included in the selected information.

(C) Travel History Updating Process

Figure 8:
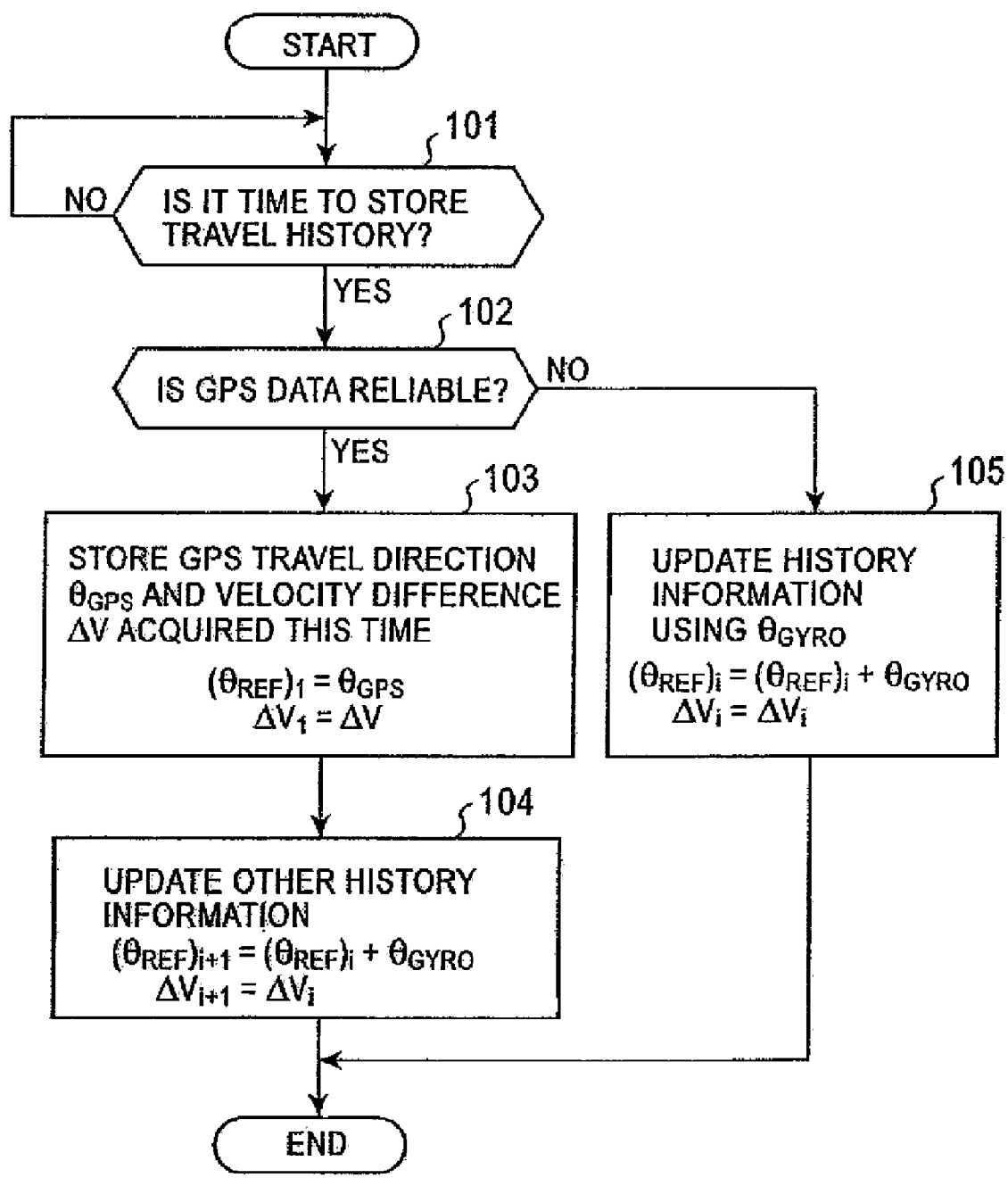
FIG. 8 is a flowchart showing a travel history updating process performed by a travel history updating unit.

FIG. 8 is a flowchart showing a travel history updating process performed by the travel history updating unit 43. FIG. 9 is a diagram describing the travel history updating.

The travel history updating unit 43 determines whether it is time to store a travel history, that is, to measure a vehicle position (step S101). If it is determined that it is time, whether GPS data is reliable is checked (step S102).

The reliability determining unit 42 determines whether the GPS data is reliable, and provides the result of the determination to the travel history updating unit 43. More specifically, the reliability determining unit 42 determines whether a vehicle position can be measured using a transmitted GPS signal, whether a vehicle velocity acquired from a transmitted GPS signal is equal to or less than 1 km/h, whether a difference value between a vehicle travel direction change acquired from a transmitted GPS signal and a travel direction change $\theta_{GYRO}$ acquired by the angle sensor 14a is equal to or greater than a preset value, and whether the value of the travel direction change $\theta_{GYRO}$ is equal to or greater than a preset value. That is, it is determined that the GPS data is unreliable when any one of the following conditions is met: a vehicle position cannot be measured using a transmitted GPS signal; a vehicle velocity acquired from a signal received from a GPS satellite is equal to or less than 1 km/h; a difference value between a vehicle travel direction change acquired from a signal received from a GPS satellite and a travel direction change $\theta_{GYRO}$ acquired by the angle sensor 14a is equal to or greater than a preset value; and the value of the travel direction change $\theta_{GYRO}$ is equal to or greater than a preset value. In contrast, it is determined that the GPS data is reliable when the following conditions are met: a vehicle position can be measured using a transmitted GPS signal; a vehicle velocity acquired from a signal received from a GPS satellite is greater than 1 km/h; a difference value between a vehicle travel direction change acquired from a signal received from a GPS satellite and a travel direction change $\theta_{GYRO}$ acquired by the angle sensor 14a is less than a preset value; and the value of the travel direction change $\theta_{GYRO}$ is less than a preset value.

If it is determined that the GPS data is reliable (see FIG. 9), the travel history updating unit 43 stores data on the latest vehicle travel direction $\theta_{GPS}$ calculated from the transmitted GPS signal and data on a velocity difference $\Delta V$ between a GPS velocity acquired from the transmitted GPS signal and a vehicle velocity acquired by the distance sensor (vehicle velocity sensor) 14b in the travel history storage section 32

(step S103). That is, updating processing is performed using the following equations.

$$(\theta_{REF})_1 = \theta_{GPS}$$

$$\Delta V_1 = \Delta V$$

Subsequently, the travel history updating unit 43 deletes the oldest travel direction history information, and updates the remaining pieces of travel direction history information by adding data on the travel direction change $\theta_{GYRO}$ calculated by the angle sensor 14a to them (step S104). That is, updating processing is performed using the following equations.

$$(\theta_{REF})_{i+1} = (\theta_{REF})_i + \theta_{GYRO}$$

$$\Delta V_{i+1} = \Delta V_i$$

Thus, all ten pieces of travel direction data are updated so as to correspond to a current vehicle travel direction.

On the other hand, in step S102, if it is determined that the GPS data is unreliable, the travel history updating unit 43 updates all pieces of the travel direction history information stored in the travel history storage section 32 by adding data on the travel direction change $\theta_{GYRO}$ to them (step S105). At that time, the velocity difference data included in each piece of the travel direction history information is not changed. That is, updating processing is performed using the following equations.

$$(\theta_{REF})_i = (\theta_{REF})_i + \theta_{GYRO}$$

$$\Delta Vi = \Delta Vi$$

Thus, like the case in which it is determined that the GPS data is reliable, all ten pieces of travel direction data are updated so as to correspond to a current vehicle travel direction.

(D) Vehicle Position Estimating Process

Figure 10:
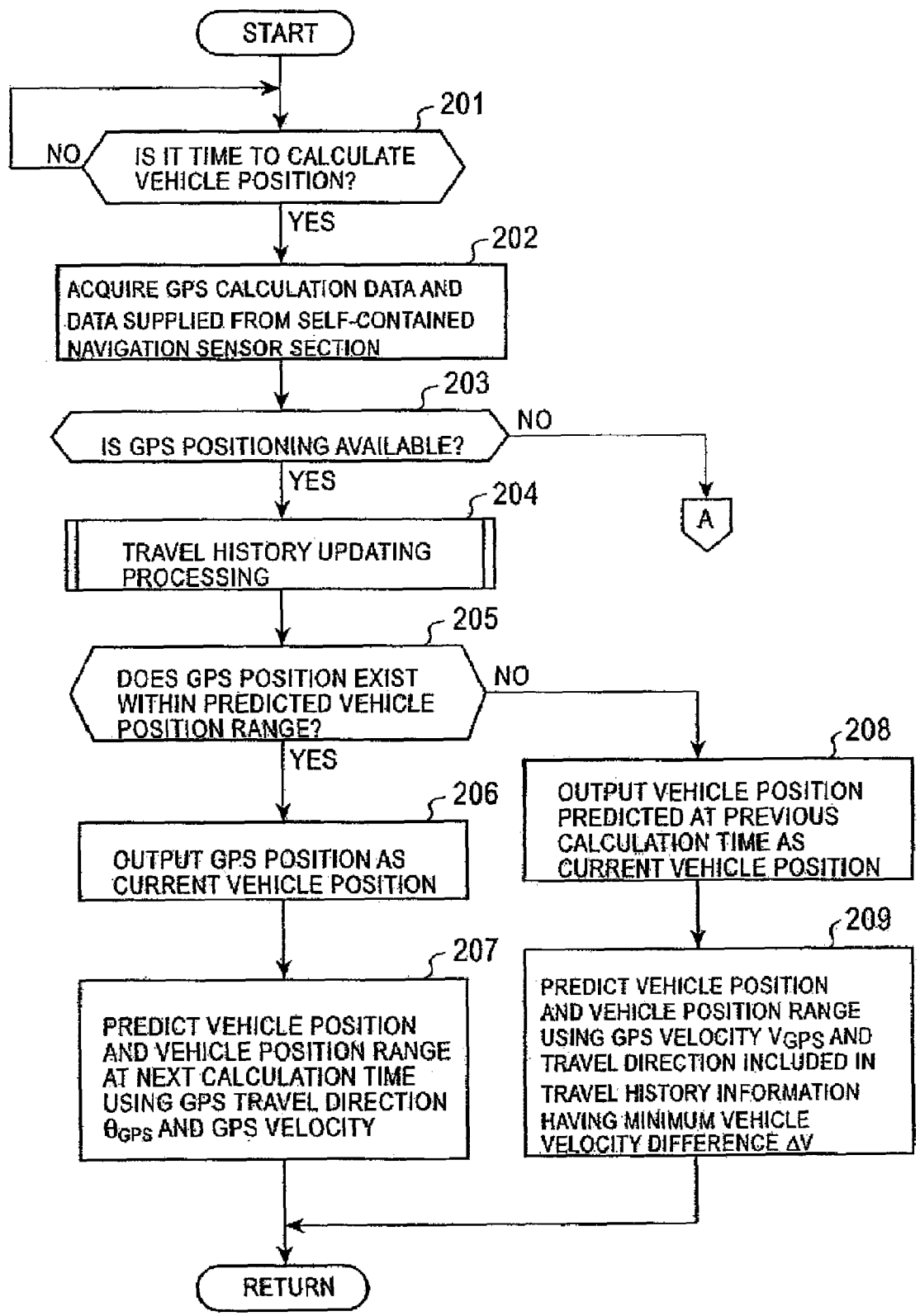
FIG. 10 is a first flowchart showing a vehicle position estimating process according to an embodiment of the present invention.
Figure 11:
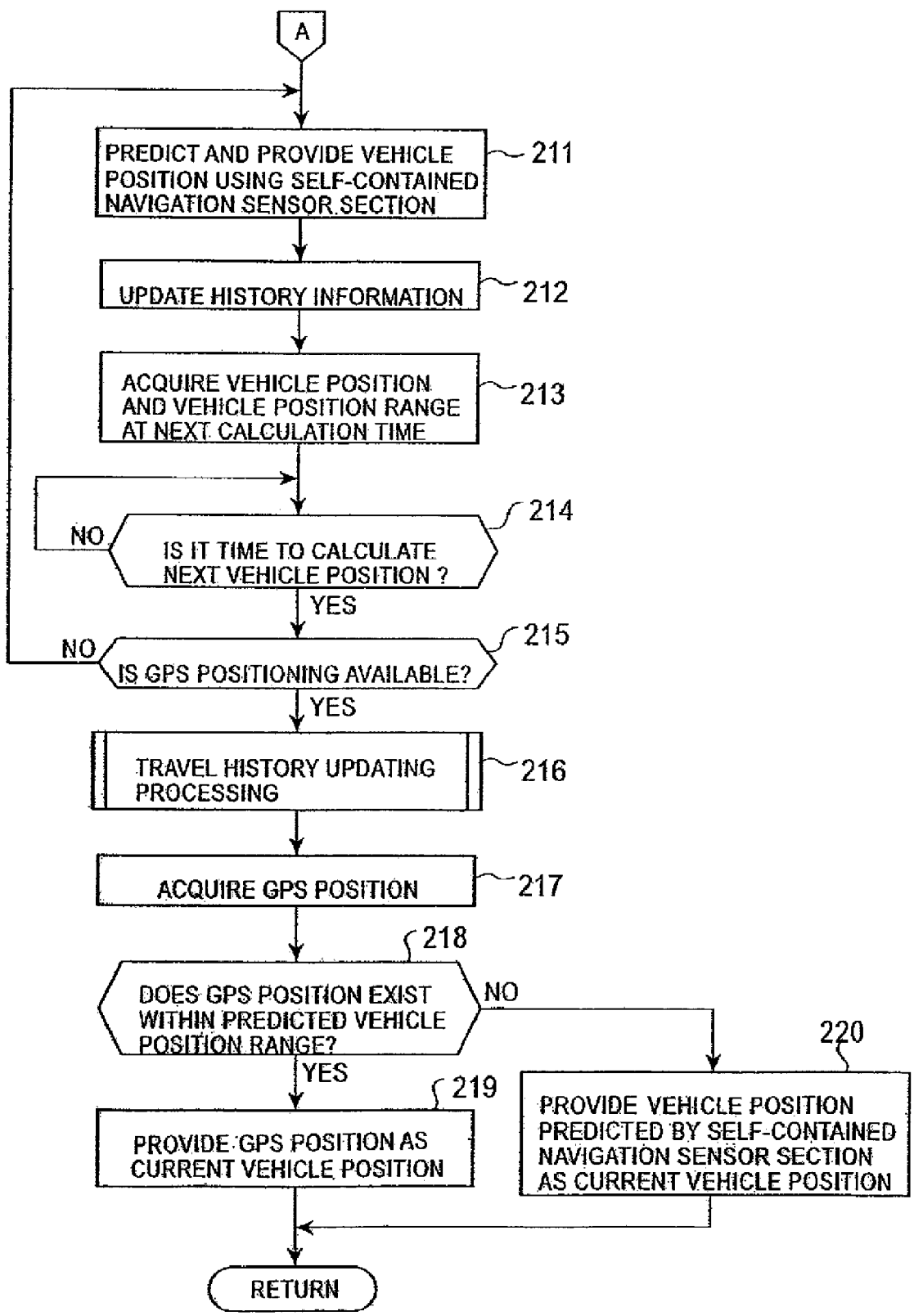
FIG. 11 is a second flowchart showing the vehicle position estimating process according to an embodiment of the present invention.

FIGS. 10 and 11 are flowcharts showing a vehicle position estimating process according to an embodiment of the present invention.

The position estimating unit 41 determines whether it is time to calculate a vehicle position (step S201). Here, the position estimating unit 41 is configured to calculate a vehicle position every certain time. If it is determined that it is time to calculate a vehicle position, the position estimating unit 41 acquires GPS calculation data (a GPS position $P_{GPS}$, a GPS velocity $V_{GPS}$, a GPS travel direction $\theta_{GPS}$, and a GPS positioning available/nonavailable signal) from the GPS receiver 13, and acquires data on a travel direction change $\theta_{GPS}$ and data on a vehicle velocity Vc from the self-contained navigation sensor section 14 (step S202).

If the above-described data acquisition processing has been completed, the position estimating unit 41 checks whether UPS positioning can be performed (step S203). If GPS positioning can be performed, the position estimating unit 41 instructs the travel history updating unit 43 to perform travel history updating processing. The travel history updating unit 43 performs travel history updating processing in accordance with the processing flow shown in FIG. 8 (step S204).

Subsequently, the position estimating unit 41 checks whether the acquired GPS position is located within a predicted vehicle position range calculated at the previous vehicle position calculation time (step S205) Here, at the previous vehicle position calculation time, the position estimating unit 41 predicted where a vehicle position will be located at the next vehicle position calculation time, calculated a vehicle position range in which a vehicle is likely to be located when the next vehicle position calculation is performed, and then stored the predicted vehicle position and the calculated vehicle position range.

If the acquired GPS position is located within the vehicle position range calculated at the previous vehicle position calculation time, the position estimating unit 41 provides the GPS position as a current vehicle position (step S206). Subsequently, the position estimating unit 41 predicts where a vehicle position will be located at the next vehicle position calculation time and predicts a vehicle position range in which the vehicle is likely to be located when the next vehicle position calculation is performed using the current vehicle position, the GPS travel direction $\theta_{GPS}$, and the OPS velocity $V_{GPS}$ (step S207), and then the process returns to the beginning.

On the other hand, in step S205, if the acquired GPS position does not exist within the vehicle position range calculated at the previous vehicle position calculation time, the position estimating unit 41 provides the vehicle position predicted at the previous vehicle position calculation time as a current vehicle position (step S208). Subsequently, the position estimating unit 41 predicts where a vehicle position will be located at the next vehicle position calculation time and predicts a vehicle position range in which the vehicle is likely to be located when the next vehicle position calculation is performed using the current vehicle position, the GPS velocity $V_{GPS}$, and data on a vehicle travel direction θ stored in the travel history storage section 32 (step S209), and then the process returns to the beginning. As the vehicle travel direction θ used in the prediction processing performed in step S209, one piece of travel direction history information including the vehicle velocity difference ΔV of the minimum value is selected from among the ten pieces of travel direction history information, and a vehicle travel direction θ included in the selected travel direction history information is used, because the reliability of the vehicle travel direction data becomes highest when the difference between a vehicle velocity $V_{GPS}$ acquired from a transmitted GPS signal (GPS velocity) and a vehicle velocity Vc acquired by the vehicle velocity sensor is smallest.

The predicted vehicle position is located at a distance L $(=V_{GPS} \times T$ (T corresponds to a vehicle position calculation cycle)) away from the current vehicle position in the vehicle travel direction θ. The predicted vehicle position range is a sector of predetermined angular width Δθ and radius L+ΔL. Even if the GPS position is unreliable, the accuracy of the GPS velocity $V_{GPS}$ detected on the basis of the Doppler shift is high.

On the other hand, in step S203, if it is determined that GPS positioning cannot be performed, the position estimating unit 41 supplies data on the vehicle position acquired at the previous vehicle position calculation time to the self-contained navigation sensor section 14, and instructs the self-contained navigation sensor section 14 to predict a vehicle position. Subsequently, the self-contained navigation position estimating unit 14c included in the self-contained navigation sensor section 14 estimates a current vehicle position, and provides data on the estimated current vehicle position to the position estimating unit 41. The position estimating unit 41 outputs the received current vehicle position data (step S211), and instructs the travel history updating unit 43 to update history information (step S212). Upon receiving the instruction from the position estimating unit 41, the travel history updating unit 43 updates history information in accordance with the same processing as that of step S105 of FIG. 8.

Subsequently, the position estimating unit 41 instructs the self-contained navigation sensor section 14 to predict where a vehicle position will be located at the next vehicle position calculation time and predict a vehicle position range in which a vehicle is likely to be located when the next vehicle position calculation is performed. Upon receiving the instruction from the position estimating unit 41, the self-contained navigation position estimating unit 14c predicts where a vehicle position will be located at the next vehicle position calculation time and predicts a vehicle position range in which a vehicle is likely to be located when the next vehicle position calculation is performed, and supplies the results of the prediction to the position estimating unit 41. The position estimating unit 41 stores the predicted vehicle position and the predicted vehicle position range which have been received from the self-contained navigation position estimating unit 14c (step S213), and determines whether it is time to calculate the next vehicle position (step S214).

If it is determined that it is time to calculate a next vehicle position, the position estimating unit 41 checks whether GPS positioning can be performed (step S215). If the GPS positioning cannot be performed, the processing of step S211 is repeated. On the other hand, if GPS positioning can be performed, the travel history updating process of FIG. 8 is performed (step S216). Subsequently, the position estimating unit 41 acquires a GPS position from the GPS receiver 13 (step S217), and checks whether the GPS position is located within the predicted vehicle position range acquired in step S213 (step S218).

If the GPS position exists within the predicted vehicle position range, the position estimating unit 41 provides data on the GPS position as a current vehicle position (step S219). If the GPS position does not exist within the predicted vehicle position range, the position estimating unit 41 provides data on the predicted vehicle position acquired in step S213 as a current vehicle position (step S220). Subsequently, the process returns to the beginning.

Thus, according to an embodiment of the present invention, a vehicle position can be appropriately estimated even when GPS signal receiving conditions are poor, and the estimated vehicle position can be displayed. In addition, a vehicle position can be appropriately estimated using a self-contained navigation sensor when GPS radio waves cannot be received and the estimated vehicle position can be displayed.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof Therefore, it is intended that this invention not be limited to the particular embodiments disclosed, but that the invention will include all embodiments falling within the scope of the appended claims.

What is claimed is:

1. A vehicle position estimating apparatus for estimating a vehicle position on the basis of a vehicle position (GPS position) calculated from a signal received from a GPS satellite, comprising:
   a travel direction history storage unit for storing vehicle travel direction history information; and
   a position estimating unit for predicting the position of a vehicle at the next position measurement time and a vehicle position range in which the vehicle is likely to be located at the next position measurement time, where the predicted vehicle position range is a predetermined area that is larger than the predicted vehicle position, and wherein, when the GPS position exists within a vehicle position range that has been predicted at the previous position measurement time, the position estimating unit defines the GPS position as the current position of the vehicle, and predicts the position of the vehicle at the next measurement time and a vehicle position range in which the vehicle is likely to be located at the next measurement time on the basis of the GPS position, a vehicle velocity (GPS velocity), and a vehicle travel direction (GPS travel direction) which are calculated from the signal received from a GPS satellite, and
   wherein, when the GPS position does not exist within the vehicle position range, the position estimating unit defines the position of the vehicle that has been predicted at the previous position measurement time as the current position of the vehicle, and predicts the position of the vehicle at the next measurement time and the vehicle position range in which the vehicle is likely to be located at the next measurement time on the basis of the current vehicle position, the GPS velocity, and data on a vehicle travel direction stored in the travel direction history storage unit.

2. The vehicle position estimating apparatus according to claim 1, further comprising:
   a self-contained navigation sensor for detecting a travel direction change $\theta_{GYRO}$ and a distance traveled every predetermined point in time;
   a GPS position reliability determining unit for determining whether a GPS position is reliable; and
   a travel direction history updating unit for updating the travel direction history information stored in the travel direction history storage unit, the travel direction history information including data on a vehicle travel direction and data on a vehicle velocity difference $\Delta V$ between a GPS velocity and a vehicle velocity detected by the self-contained navigation sensor, and
   wherein, when it is determined by the GPS position reliability determining unit that a GPS position is reliable, the travel direction history updating unit stores the latest GPS travel direction calculated from a signal received from a GPS satellite and the vehicle velocity difference $\Delta V$ in the travel direction history storage unit as the latest piece of travel direction history information, and deletes the oldest piece of travel direction history information stored in the travel direction history storage unit, and updates any remaining pieces of travel direction history information stored in the travel direction history storage unit by adding the travel direction change $\theta_{GYRO}$ to the remaining pieces of travel direction history information, and
   wherein, when it is determined by the GPS position reliability determining unit that the GPS position is unreliable, the travel direction history updating unit updates the travel direction history information stored in the travel direction history storage unit by adding the travel direction change $\theta_{GYRO}$ to all the pieces of travel direction history information, and
   wherein, when a GPS position does not exist within a vehicle position range that was predicted at the previous position measurement time, the position estimating unit predicts the position of the vehicle at the next measurement time and a vehicle position range in which the vehicle is likely to be located at the next measurement time on the basis of data on a vehicle travel direction $\theta$ included in one of the pieces of travel direction history information having data on the vehicle velocity difference $\Delta V$ of the minimum value.

3. The vehicle position estimating apparatus according to claim 2, wherein the GPS position reliability determining unit determines that a GPS position is unreliable when any one of the following conditions is met: a vehicle position cannot be measured using a signal received from a GPS satellite, a vehicle velocity calculated from a signal received from a GPS satellite is equal to or lower than 1 km/h, a difference value between a GPS travel direction change and the travel direction change $\theta_{GYRO}$ detected by the self-contained navigation sensor is equal to or greater than a preset value, and the value of the travel direction change $\theta_{GYRO}$ is equal to or greater than a preset value.

4. The vehicle position estimating apparatus according to claim 1,
further comprising a self-contained navigation position estimating unit for predicting the position of the vehicle at the next position measurement time and a vehicle position range in which the vehicle is likely to be located at the next position measurement time on the basis of a signal provided from a self-contained navigation sensor, and
wherein, when a vehicle position cannot be measured using a signal received from a GPS satellite, the position estimating unit defines a vehicle position that has been predicted by the self-contained navigation position estimating unit as a current vehicle position, and
wherein, after it has become possible to measure a vehicle position using a signal received from a GPS satellite, when a GPS position exists within a vehicle position range that has been predicted by the self-contained navigation position estimating unit, the position estimating unit defines the GPS position as a current vehicle position, and, when the GPS position does not exist within the vehicle position range, the position estimating unit defines the vehicle position that has been predicted by the self-contained navigation position estimating unit as a current vehicle position.

5. A vehicle position estimating method of estimating a vehicle position on the basis of a vehicle position (GPS position) calculated from a signal received from a GPS satellite, comprising:
storing a plurality of pieces of vehicle travel direction history information in a travel direction history storage unit; and
predicting the position of a vehicle at the next position measurement time and a vehicle position range in which the vehicle is likely to be located at the next position measurement time, where the predicted vehicle position range is a predetermined area that is larger than the predicted vehicle position, and
wherein, when the GPS position exists within a vehicle position range that has been predicted at the previous position measurement time, the GPS position is defined as the current position of the vehicle, and the position of the vehicle at the next measurement time and a vehicle position range in which the vehicle is likely to be located at the next measurement time are predicted on the basis of the GPS position, a vehicle velocity (GPS velocity), and a vehicle travel direction (GPS travel direction) which are calculated from the signal received from a GPS satellite, and
wherein, when the GPS position does not exist within the vehicle position range, the position of the vehicle that has been predicted at the previous position measurement time is defined as the current position of the vehicle, and the position of the vehicle at the next measurement time and the vehicle position range in which the vehicle is likely to be located at the next measurement time are predicted on the basis of the current vehicle position, the GPS velocity, and data on a vehicle travel direction stored in the travel direction history storage unit.

6. The vehicle position estimating method according to claim 5, further comprising:
causing a self-contained navigation sensor to detect a travel direction change $\theta_{GYRO}$ and a distance traveled every predetermined point in time;
determining whether a GPS position is reliable; and
updating the pieces of travel direction history information, each piece including data on a vehicle travel direction and data on a vehicle velocity difference $\Delta V$ between a GPS velocity and a vehicle velocity detected by the self-contained navigation sensor, and
wherein, when it is determined that a GPS position is reliable, the latest GPS travel direction calculated from a signal received from a GPS satellite and the vehicle velocity difference $\Delta V$ are stored in the travel direction history storage unit as the latest piece of travel direction history information, the oldest piece of travel direction history information stored in the travel direction history storage unit is deleted, and the remaining pieces of travel direction history information stored in the travel direction history storage unit are updated by adding the travel direction change $\theta_{GYRO}$ to the remaining pieces of travel direction history information, and
wherein, when it is determined that the GPS position is unreliable, all the pieces of travel direction history information stored in the travel direction history storage unit are updated by adding the travel direction change $\theta_{GYRO}$ to all the pieces of travel direction history information, and
wherein, when a GPS position does not exist within a vehicle position range that was predicted at the previous position measurement time, the position of the vehicle at the next measurement time and a vehicle position range in which the vehicle is likely to be located at the next measurement time are predicted on the basis of data on a vehicle travel direction $\theta$ included in one of the pieces of travel direction history information having data on the vehicle velocity difference $\Delta V$ of the minimum value.

7. The vehicle position estimating method according to claim 6, wherein it is determined that a GPS position is unreliable when any one of the following conditions is met: a vehicle position cannot be measured using a signal received from a GPS satellite, a vehicle velocity calculated from a signal received from a GPS satellite is equal to or lower than 1 km/h, a difference value between a GPS travel direction change and the travel direction change $\theta_{GYRO}$ detected by the self-contained navigation sensor is equal to or greater than a preset value, and the value of the travel direction change $\theta_{GYRO}$ is equal to or greater than a preset value.

8. The vehicle position estimating method according to claim 5,
further comprising predicting the position of the vehicle at the next position measurement time and a vehicle position range in which the vehicle is likely to be located at the next position measurement time on the basis of a signal provided from a self-contained navigation sensor, and
wherein, when a vehicle position cannot be measured using a signal received from a GPS satellite, a vehicle position that has been predicted using the signal provided from the self-contained navigation sensor is defined as a current vehicle position, and wherein, after it has become possible to measure a vehicle position using a signal received from a GPS satellite, when a GPS position exists within a vehicle position range that has been predicted using the signal provided from the self-contained navigation sensor, the GPS position is defined as a current vehicle position, and, when the GPS position does not exist within the vehicle position range, the vehicle position that has been predicted using the signal provided from the self-contained navigation sensor is defined as a current vehicle position.

* * * * *